3,161,053
DEPTH GAUGES
Basil Edward Bell, Zanzibar, East Africa, assignor to National Research Development Corporation, London, England, a British corporation
Filed Feb. 1, 1962, Ser. No. 170,394
Claims priority, application Great Britain, Feb. 15, 1961, 5,671/61
11 Claims. (Cl. 73—300)

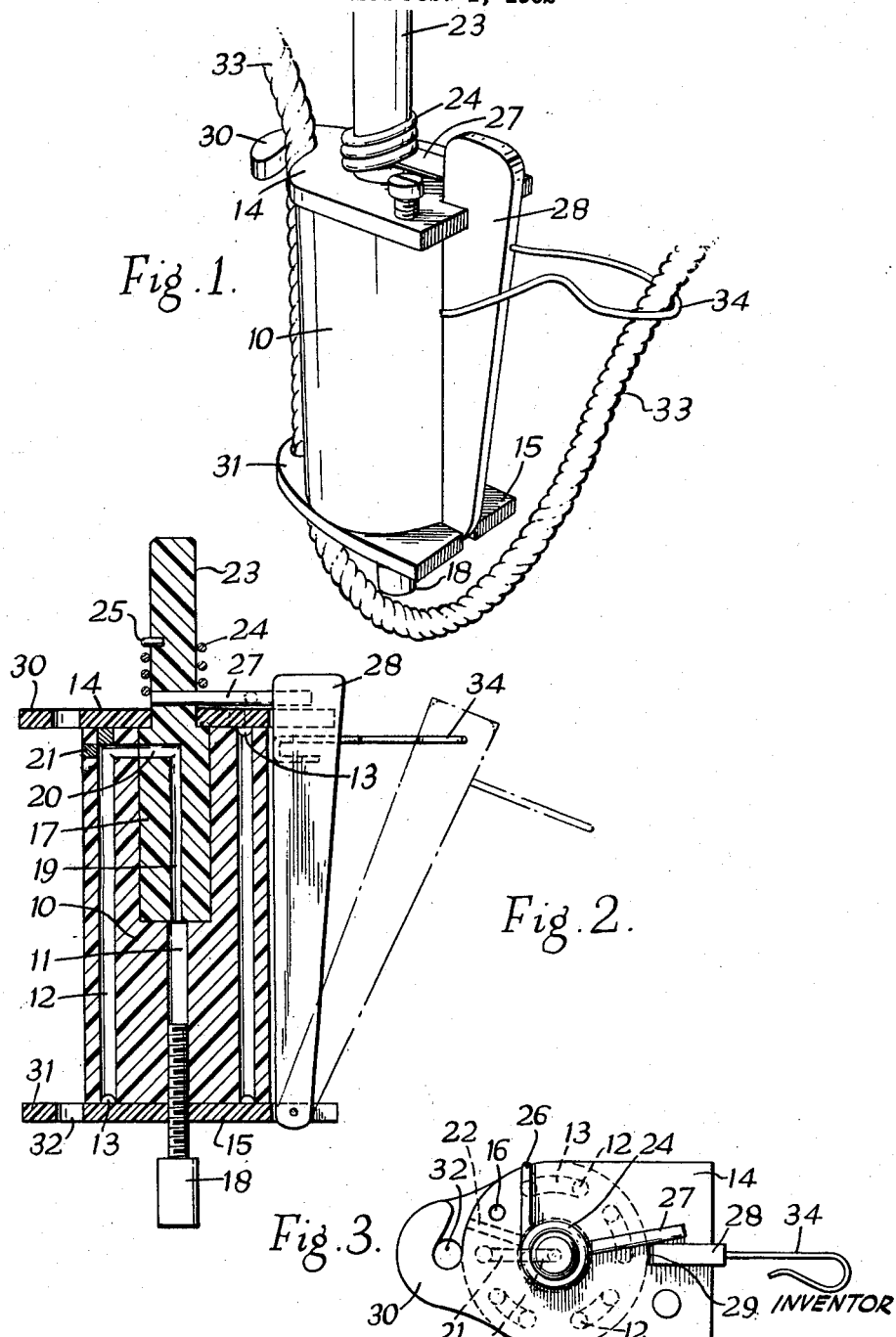

The present invention relates to a depth gauge for determining depths in a body of liquid, especially the sea, by lowering the gauge to a position whose depth is to be measured, operating it at that depth, and then removing the gauge from the liquid to read off the position recorded.

The type of depth gauge with which the invention is particularly concerned is that in which a gas, usually air, is compressed within the gauge by the pressure prevailing in the liquid at the measured depth. Such depth gauges commonly suffer from the disadvantage that the change of volume of the gas with depth is approximately logarithmic rather than linear, and the range of depth over which they can be used to give reasonably accurate readings is severly restricted in consequence.

One object of the present invention is to enable this disadvantage to be overcome and provide a depth gauge having an approximately linear scale.

In accordance with the invention there is provided a depth gauge responsive to the pressure prevailing in a body of liquid at any depth to be measured to provide an indication of that depth after removal from the liquid, the gauge having a body, a cavity within the body, a channel open at one end to the exterior and communicating at its other end with the cavity through a valve, and means for closing the valve to cut off the cavity from the channel while the gauge is immersed in the liquid, the gauge being so constructed and arranged that on immersion of the gauge in the liquid gas contained in the channel and cavity is compressed by liquid entering the channel. The volumes of gas and liquid in the channel when the valve is closed are determined by the pressure prevailing in the liquid at the depth of closure and as the gauge is removed from the liquid the gas expands from that pressure to the pressure at the surface of the liquid, expelling some of the liquid. The volume of liquid remaining in the channel provides a measure of the required depth and may conveniently be determined by observing the length of the thread of liquid in a portion of the channel of uniform cross-section.

Preferably the gas cut off in the cavity on closure of the valve is released from the gauge. Preferably also the closure of the valve takes place under the influence of a spring upon operation of a trigger mechanism.

One embodiment of the invention will now be described by way of example with reference to the accompanying drawings, in which:

FIG. 1 is a perspective view of a depth gauge in accordance with the invention mounted on a line and set ready for lowering into the sea, FIG. 2 is a longitudinal section of the gauge of FIG. 1, and FIG. 3 is an end view of the gauge.

In this embodiment the body 10 of the gauge is constituted by an acrylic resin rod 25 mm. in diameter and 50 mm. long in which have been drilled an axial hole 11 and ten further holes 12 parallel to the axial hole 11 and arranged in a ring round it. All these holes are of the same diameter, 2.5 mm. The ten holes 12 in the ring are connected in series by cross cuts 13 alternately at one end and the other of the rod to form a continuous channel, the cross cuts being covered by end plates 14 and 15 to form conduits running from one of the ten holes to the next around the ring. The end plates 14 and 15 also close the ends of the ten holes 12 except for a single aperture 16 in the end plate 14 registering with the first hole in the series.

The axial hole 11 in the body 10 is enlarged at one end and a valve member 17 is located within this enlarged portion of the axial hole. The other end of the axial hole 11 is closed by a brass adjusting screw 18 extending through the corresponding end plate 15. A cavity is thus formed by the portion of the axial hole 11 between the end of the adjusting screw 18 and the valve member 17. The valve member 17 is rotatable in the enlarged portion of the axial hole 11 and has an axial bore 19 and a communicating radial bore 20 through which the cavity can be put into communication either with the last of the series of ten holes 12 forming the channel or with the exterior of the body, through transverse drillings 21 and 22 respectively in the body, by rotation of the valve member 17.

The valve member 17 is integral with an operating rod 23 of slightly small diameter which passes out through the corresponding end plate 14. A coil spring 24 surrounds the operating rod 23 and one end 25 of the spring is located in a pocket in the rod 23 to prevent relative rotation. The other end 26 of the spring is secured against rotation by engagement with a notch in the end plate 14. A trigger stop 27 extends radially outwards from the operating rod 23 to engage a trigger in the form of a strip 28 hinged to the end plate 15 at the other end of the body and extending through an open-ended slot 29 in the end plate 14. In the set position, with the trigger stop 27 engaging the end of the trigger 28 and the spring 24 under tension, the valve member 17 is in the position in which the channel formed by the ring of ten holes 12 is connected to the cavity in the axial hole 11. When the trigger 28 is released by pulling it out of the slot 29 in the end plate 14 to the position shown in broken lines in FIG. 2 the operating rod 23 is rotated by the spring 24 and carries the valve member 17 to the position in which the channel is closed and the cavity is in communication with the exterior.

The end plates 14 and 15 each have a lug, the lug 30 on the end plate 14 being in the form of a hook and the lug 31 on the end plate 15 having an aperture 32. In use the trigger 28 is fastened in the set position by a fine thread encircling the body 10 of the gauge and the gauge is mounted on a length of rope 33 which as shown in FIG. 1 passes under the hook of the lug 30, through the aperture 32 in the other lug 31 and under a wire hook 34 attached to the trigger 28. When the rope 33 is straightened by a force of sufficient strength the trigger 28 is pulled out, breaking the thread, and the valve is closed by the action of the spring 24.

The gauge is lowered into the sea in the set condition and is operated when it reaches the depth which is to be measured. As it descends the pressure increases and water enters the open end of the first hole in the series of ten forming the channel, the air in the gauge being compressed. At the desired depth the valve is closed, releasing a fixed volume of air and leaving a small volume of compressed air in the channel. This compressed air expands with falling pressure as the gauge is brought to the surface and expels some, but not all, of the water from the channel.

It can be shown mathematically that, assuming that Boyle's Law is obeyed by the air in the gauge, the volume of water $V_w$ remaining in the gauge is given by $$V_w = V_c = \left[\frac{P_\alpha}{P_0} - 1\right]$$

where $V_c$ is the volume of the cavity (including that of the bores in the valve member), and $P_a$ is the pressure prevailing at a depth $\alpha$ at which the gauge is operated. Thus $V_w$ is a linear function of $P_a$ between the limits $V_w=0$ when $\alpha=0$ and $V_w=V_t$, the volume of the channel, when $$\frac{P_\alpha - P_0}{P_0} = \frac{V_t}{V_c}$$

This expression shows that the depth range of the gauge depends upon the ratio of the volumes of the channel and the cavity. In the gauge described this ratio is 20:1, giving the gauge a range of approximately 200 metres. The total length of the channel is 500 mm. and the scale is thus 2.5 mm. length of water column to 1 metre of depth.

In fact over a range of pressures of up to 20 atmospheres the air will not obey Boyle's Law but the error resulting is calculable and can be allow for in the calibration of the gauge or by means of a correction table. Lack of uniformity in the change of pressure with depth can be allowed for in the same way. Further corrections can be made for the variation of temperature with depth and the changing pressure at the surface, if known. The initial calibration of the gauge can be adjusted by means of the adjusting screw which changes the volume of the cavity.

Various modifications are possible of the gauge which has been described by way of example. Thus it may be preferable to form the conduits connecting the several portions of the channel by grooves in the surface of the end plate rather than cross-cuts in the main cylindrical body. The triggering mechanism may take a wide variety of forms and may be arranged to be actuated automatically when a predetermined time has elapsed or in dependence upon some property or characteristic of the surrounding liquid or its movement relative to the gauge. To prevent loss of air by diffusion into the water a separator may be employed which slides within the channel, for example a thread of mercury.

What I claim is:

1. A depth gauge responsive to the pressure prevailing in a body of liquid at any depth to be measured to provide an indication of that depth after removal from the liquid comprising a body defining a cavity therein and a channel open at one end to the exterior and communicating at its other end with the cavity, a valve disposed in said body to control communication between said cavity and said channel, and means for operating said valve to cut off communication between said cavity and said channel when the gauge is immersed in the body of liquid, whereby gas contained in said channel and said cavity is compressed by liquid entering said channel when said gauge is immersed in the liquid body.

2. A depth gauge responsive to the pressure prevailing in a body of liquid at any depth to be measured to provide an indication of that depth after removal from the liquid comprising a body defining a cavity therein and a channel open at one end to the exterior and communicating at its other end with said cavity, said body further defining a passage leading to the exterior of the gauge, a valve disposed between said channel, said passage and said cavity and rotatable between an open position in which said cavity is in communication with said channel and a closed position in which said cavity is in communication with said passage, means to bias said valve towards said closed position, a trigger mechanism to retain said valve in said open position, said trigger mechanism being releasable to provide closing of said valve under the influence of said biasing means when the gauge reaches the depth to be measured and means to adjust the volume of said cavity.

3. A depth gauge including an assembly comprising a body structure and a valve member mounted in said body structure for movement between open and closed positions; said body having a cavity and a channel therein, said channel having one end open to the exterior of the gauge and another end in communication with the cavity through said valve member when the valve member is in its open position, the cavity being isolated from the channel when the valve member is in its closed position; said gauge being so constructed that, on immersion of the gauge in a liquid, liquid entering the open end of the channel compresses gas contained in the channel and cavity, whereby movement of the valve member to its closed position provides for exhausting a predetermined volume of the compressed gas and whereby a volume of liquid indicative of the pressure at which the valve was closed, remains in the channel when the gauge is removed from the liquid.

4. A depth gauge as claimed in claim 3 in which said body structure has a passage therein to provide communication between the cavity and the exterior of the gauge when the valve member is in its closed position whereby the said predetermined volume of gas may escape from the gauge.

5. A depth gauge as claimed in claim 4 in which the body structure includes a passage open at its outer end to the exterior of the gauge and the valve member is rotatably mounted in the body structure for movement between the said open position and a closed position in which the cavity communicates with the inner end of said passage.

6. A depth gauge as claimed in claim 3 including spring means biasing said valve member towards a closed position and a trigger mechanism constructed to hold the valve member in its open position until said trigger is actuated to allow the spring to move the valve member to the closed position.

7. A depth gauge as claimed in claim 3 wherein the body structure comprises a body having communicating bores which form the said channel.

8. A depth gauge as claimed in claim 3 including means for adjusting the volume of the cavity.

9. A depth gauge including a body having a cavity and a channel formed therein, and a valve member movably mounted in the body and having a passage therethrough for connecting said cavity and one end of said channel, the other end of said channel being open to the exterior of said gauge, means biasing said valve member towards a closed position in which said valve member separates the cavity from the channel, and trigger mechanism holding the valve member in an open position in which said passage connects said cavity and said channel, said trigger mechanism being operable to release said valve member for movement by said biasing means to the closed position.

10. A depth gauge as claimed in claim 9 in which the valve member is rotatably mounted in a bore in said body and said body has an outlet passage extending to the exterior of the gauge and communicating at its inner end with the passage through the valve member when the valve member is in its closed position.

11. A depth gauge as claimed in claim 9 including screw means for adjusting the volume of said cavity.

References Cited in the file of this patent
UNITED STATES PATENTS
1,751,375     Warluzel _____ Mar. 18, 1930